US008509613B2

(12) United States Patent
Chung et al.

(10) Patent No.: US 8,509,613 B2
(45) Date of Patent: Aug. 13, 2013

(54) MONITORING OF OPTICAL TRANSMISSION SYSTEMS BASED ON CROSS-CORRELATION OPERATION

(75) Inventors: Yun Chur Chung, Daejeon (KR); Yuichi Takushima, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1173 days.

(21) Appl. No.: 12/081,294

(22) Filed: Apr. 14, 2008

(65) Prior Publication Data

US 2009/0257743 A1 Oct. 15, 2009

(51) Int. Cl.
*H04B 10/08* (2006.01)

(52) U.S. Cl.
USPC ............................................. 398/17; 398/21

(58) Field of Classification Search
USPC ...................................................... 398/17, 21
See application file for complete search history.

(56) References Cited

U.S. PATENT DOCUMENTS

| | | | |
|---|---|---|---|
| 4,911,515 A | 3/1990 | So et al. | |
| 5,000,568 A | 3/1991 | Trutna, Jr. et al. | |
| 6,548,806 B1 | 4/2003 | Chung et al. | |
| 6,882,410 B2 * | 4/2005 | Asahina et al. | 356/73.1 |

OTHER PUBLICATIONS

U. Hilbk et al., "Selective OTDR Measurements at the central office of individual fiber links in a PON," *Optical Fiber Communication Conference and Exhibit, Technical Digest*, Optical Society of America, 1997, pp. 54.

K. Tanaka et al., "In-service Individual Line Monitoring and a Method for Compensating for the Temperature-dependent Channel Drift of a WDM-PON Containing an AWGR Using a 1.6 μm Tunable OTDR," *Proceedings of European Conference on Optical Communication*, 3, 1997, paper 448, pp. 295-298.
K.W. Lim et al., "Fault Localization in WDM Passive Optical Network by Reusing Downstream Light Sources," *IEEE Photonics Technology Letters*, vol. 17, No. 12, Dec. 2005, pp. 2691-2693.
W. Soto, "Optical Testing for Passive Optical Networks," *Optical Fiber Communication Conference and Exposition and The National Fiber Optic Engineers Conference, Technical Digest*, Optical Society of America, 2008, paper NThB5.
Y. Takushima et al., "Optical reflectometry based on correlation detection and its application to the in-service monitoring of WEM passive optical network," *Optics Express*, vol. 15, No. 9, Apr. 16, 2007, pp. 5318-5326.
N. Takeuchi et al., "Random modulation cw lidar," *Applied Optics*, vol. 22, No. 9, May 1983, pp. 1382-1386.
M. Nazarathy et al., "Real-Time Long Range Complementary Correlation Optical Time Domain Reflectometer," *Journal of Lightwave Technology*, vol. 7, No. 1, Jan. 1989, pp. 24-37.

* cited by examiner

*Primary Examiner* — Danny Leung

(74) *Attorney, Agent, or Firm* — Oliff & Berridge, PLC

(57) ABSTRACT

In optical communication systems, an optical signal which is modulated with a data signal is transmitted from an optical transmitter, and is launched into a fiber-optic transmission link. The present invention provides a method and an apparatus for the measurement of the distribution of the reflectivity along an optical transmission line implemented by using the signal processing based on the cross-correlation function between the data signal with which the optical transmitter is modulated and the back-reflected signal returned to the optical transmitter to provide the in-service monitoring of the fiber-optic transmission link.

13 Claims, 6 Drawing Sheets

MONITORING OF OPTICAL TRANSMISSION SYSTEMS BASED ON CROSS-CORRELATION OPERATION

BACKGROUND OF THE INVENTION

1. Field of the Invention

The present invention generally relates to optical fiber communication systems, and more particularly to a method and an apparatus for the measurement of the distribution of the reflectivity along an optical transmission line to provide the in-service monitoring of a fiber-optic transmission link.

2. Description of the Related Art

The distribution of the back-reflected light along the fiber-optic transmission link is an important parameter for identifying the problems in the outside plant. An optical time-domain reflectometer (OTDR) has been widely used to measure this distribution. In the measurement based on the OTDR, an optical short pulse or OTDR pulse is launched into the fiber-optic transmission link, and the reflected signal is measured as a function of the time like a lidar system. A modern OTDR can provide sufficient spatial resolution and dynamic range required for the characterization of the transmission link. Thus, there have been many efforts to utilize the OTDR for the in-service monitoring of various types of fiber-optic transmission systems. In these techniques, a supervisory channel at a different wavelength from that of transmission signals is used for the OTDR pulses so as not to disturb other signal channels in service.

However, it is not straightforward to apply these techniques based on the OTDR in wavelength-division multiplexed (WDM) networks due to the WDM multiplexers and de-multiplexers placed along the transmission link. For example, in a WDM passive optical networks (WDM PON) implemented by using an arrayed-waveguide grating (AWG) at the remote node (RN), these techniques cannot monitor the failures in the drop fibers (which connects the RN and each subscriber) since the OTDR pulse is blocked at the RN. Several techniques have been proposed to solve this problem by implementing additional couplers to bypass the AWG at the RN (see U. Hilbk, M. Burmeister, B. Hoen, T. Hermes, J. Saniter, and F. J. Westphal, "Selective OTDR measurements at the central office of individual fiber link in a PON," in Optical Fiber Communication Conference and Exhibit, Technical Digest (Optical Society of America, 1997), paper Tuk3.), using a tunable OTDR (see K. Tanaka, H. Izumita, N. Tomita, and Y. Inoue, "In-service individual line monitoring and a method for compensating for the temperature-dependent channel drift of a WDM-PON containing an AWGR using a 1.6 mm tunable OTDR," in Proceedings of European Conference on Optical Communication, 3, paper 448, pp. 295-298 (1997)), or generating the OTDR pulse for a specific drop fiber by using the corresponding WDM transmitter (see K. W. Lim, E. S. Son, K. H. Han, and Y. C. Chung, "Fault localization in WDM passive optical network by reusing downstream light sources," IEEE Photon. Technol. Lett., 17, 2691 (2005); and U.S. Pat. No. 6,548,806). However, it should be noted that all these techniques require the termination of the service of the corresponding WDM channel during the process of monitoring the status of drop fibers. Also, the OTDR using the supervisory channel is not suitable for the use in the conventional PONs. This is because the direct application of these methods has proved to be too costly for the integration with the optical transmitter. In addition, the allocation of the supervisory channel for OTDR prevents the future wavelength assignment for future services, and it can cause transmission impairments caused by nonlinear optical interactions.

One way to cope with these problems is the use of the optical signal light itself for data transmission, instead of using the OTDR pulse. In the digital transmission, each '1' bit is essentially a small OTDR pulse. The reflected signal is a time-delayed superposition of all reflections from all bits that were sent in the past round-trip time. Therefore, by calculating the correlation between the data signal and the back-reflected signal, the reflection point can be found. This idea was implemented in U.S. Pat. No. 4,911,515 by using a variable delay line and a correlator. As is pointed out in W. Soto, "Optical testing for passive optical networks," Optical Fiber Communication Conference and Exposition and The National Fiber Optic Engineers Conference, Technical Digest (Optical Society of America, 2008), paper NThB5., however, this method is very difficult to apply to a system operated at high data-rate. For example, in a 40-km long optical transmission system, the round-trip time for the reflected light is 400 microseconds at maximum, and it corresponds to 500,000 bits when the data rate is 1.25 Gbit/s. Therefore, for the calculation of the correlation, it is needed to store the data of 500,000 samples at the rate of 1.25 Gsamples/s. This is the large obstacle since the large fast memories and the extremely fast correlator are needed.

In addition, this method has a severe limitation on the dynamic range. This problem was pointed in Y. Takushima and Y. C. Chung, "Optical reflectometry based on correlation detection and its application to the in-service monitoring of WDM passive optical network," Optics Express, 15, 5318-5326 (2007). The method based on the correlator utilizes the optical signal light which is modulated with the transmission data. The transmission data can be considered a random bit sequence, but the correlation characteristics are not perfect when the data length used to calculate the correlation is finite. This results in the background noise on the reflectometry trace, and leads to a fatal limit in the dynamic range of the reflectometry. This problem is originated from the fact that the true random signal (i.e. the data to be transmitted) is used as the reference signal. To avoid this problem, some special bit-sequences such as M-sequence and Gray code are used in the random-modulation CW lidar and the complementary correlation OTDR (see N. Takeuchi, N. Sugimoto, H. Baba, and K. Sakurai, "Random modulation cw lidar," Appl. Opt., 22, 1382 (1983); M. Nazarathy, S. A. Newton, R. P. Giffard, D. S. Moberly, F. Sischika, W. R. Trutna, Jr., and S. Foster, "Real-time long range complementary correlation optical time domain reflectometer," J. Lightwave Technology, 7, 24 (1989); and U.S. Pat. No. 5,000,568). These special bit-sequences have a delta-function-like autocorrelation function without background noise, and they are ideal as a reference signal for cross-correlation detection. However, since the objective of the present invention is the in-service monitoring, and hence, there is no choice of the bit-sequence for the reference signal, and these methods in M. Nazarathy, S. A. Newton, R. P. Giffard, D. S. Moberly, F. Sischika, W. R. Trutna, Jr., and S. Foster, "Real-time long range complementary correlation optical time domain reflectometer," J. Lightwave Technology, 7, 24 (1989) and U.S. Pat. No. 5,000,568 cannot be applied.

SUMMARY OF THE INVENTION

Therefore, the present invention has been made in view of the above problems, and it is an objective of the present invention to provide the in-service monitoring of the distribution of the reflectivity in a more practical manner. Unlike the conventional OTDR, the present invention does not need any short-pulse sources, but uses the data-modulated optical transmitter itself. The distribution of the back-reflected light is obtained by calculating the cross-correlation function between the signals obtained by low-pass-filtering of the data signal and back-reflected signal. This low-pass filtering is used to limit the signal bandwidth to that determined by the spatial resolution of the reflectometry, and it is much lower than the data rate of the transmission signal. For example, when the required spatial resolution is 10 m, the filter bandwidth, i.e., the cut-off frequency of the low-pass filter is chosen to be 4.4 MHz. Since the filter bandwidth is much narrower than the signal bandwidth, which is typically 640 Mbit/s~2.5 Gbit/s in PON systems, the transmitted and the back-reflected signals are severely distorted after the low-pass filtering, and consequently, their waveforms becomes Gaussian-noise-like. However, by calculating the cross-correlation function of the filtered signals, the distribution of the reflectivity can be obtained with the designated resolution. In the present invention, the data acquisition rate can be reduced to the Nyquist frequency of the low-pass filtered signals. As a result, the requirements for the size of the memory and the data processing speed are greatly relaxed, compared with the method disclosed in U.S. Pat. No. 4,911,515. For example, for the reflectometry of the 40-km long optical transmission system, the present invention needs only 3520 samples at the sampling rate of 8.8 Msamples/s. The improvement factor is more than 300 compared with the method disclosed in U.S. Pat. No. 4,911,515. In addition, owing to the signal processing based on the cross-correlation function, the proposed method does not require the variable delay.

The use of the optical transmission signal as the probe light may cause the problems of the limitation of the dynamic range. However, a novel method to solve this problem is provided in the present invention. The method of the present invention estimates the background noise component from the autocorrelation function of the data signal and cancels it out by subtracting the estimated noise from the measured cross-correlation function.

The present invention can utilize the existing optical transmitters without any modifications. In addition, the in-service monitoring is realized not at the supervisory wavelength but at the signal wavelength. Thus, the problem of using the conventional OTDR can be also solved.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

While the invention has been shown and described with respect to the preferred embodiments, it will be understood by those skilled in the art that various changes and modifications may be made without departing from the scope and spirit of the invention. Thus, the scope of the invention should not be limited by the embodiments of the present invention.

[Detail of the Principle of Operation of the Present Invention]

Figure 1:
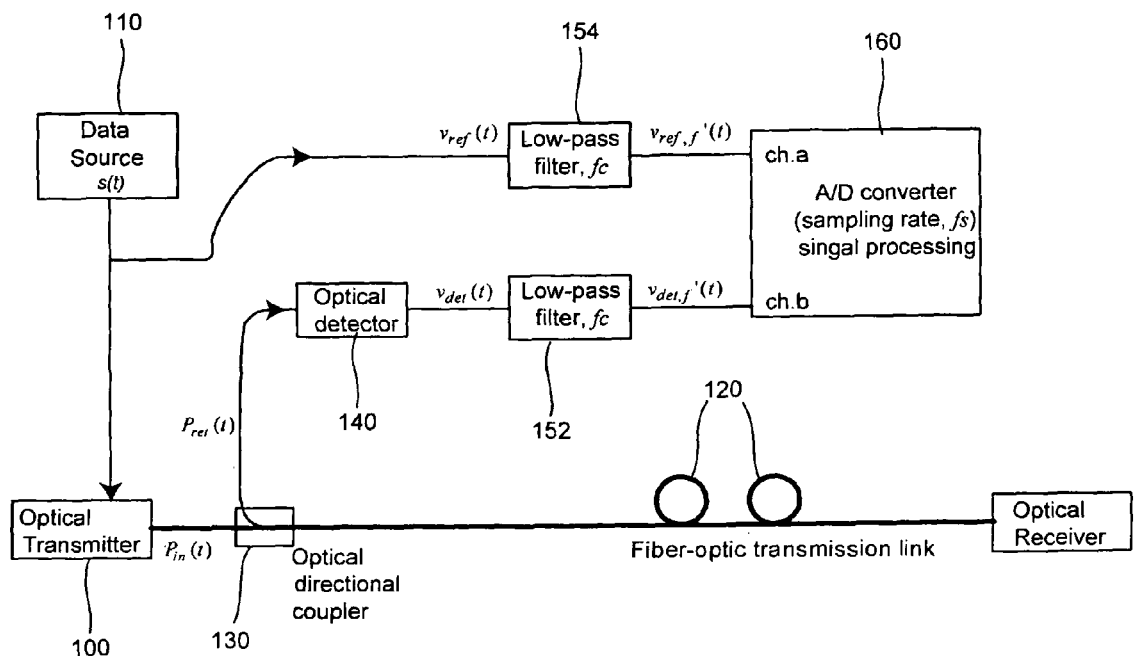
FIG. 1 shows the schematic block diagram of the apparatus of the present invention.

FIG. 1 shows the schematic block diagram of the apparatus of the present invention. An optical transmitter 100 is driven with a binary signal from a data source 110 at a bit-rate B and signal light is launched into a transmission fiber. The optical transmission signal is launched into the fiber-optic transmission link 120. In order to detect the back-reflected signal, an optical coupler 130 is inserted in front of the optical transmitter 100. (The optical coupler 130 can be replaced with other optical devices such as an optical isolator.) The back-reflected light is detected by an optical detector 140 to convert the optical signal to the electric signal. Both the data signal and the back-reflected signal are filtered by using low-pass filters 152 and 154 to limit the bandwidth to that required to realize the designated spatial resolution. The cut-off frequency can be much lower than those signal bandwidths. It should be noted that this filter is not for eliminating the out-of-band noise. Then, the filtered signals are acquired by using an analog-to-digital (A/D) converter 160. Finally, the reflectometry trace is obtained by the signal processing based on the cross-correlation function as follows.

Let s(t) be the transmitted binary signal having a value of +1 or −1 and T the bit duration of the signal (=1/B). The input optical power is expressed by $P_{in}(t)=P_a(1+s(t))$, where $P_a$ is the average input power. If the distribution of the reflectivity including the round-trip loss is denoted as R(z), the power of the light back-reflected to the transmitter can be expressed as $P_{ref}(t)=P_{in}(t) \otimes R(v_c t/2)$, where $\otimes$ stands for the convolution operation, and $v_c$ is the group velocity of light in the fiber. Then, the back-reflected light is detected by using a photo detector. The signal voltage after the detection $v_{det}(t)$ can be expressed by the sum of dc- and ac-components as follows:

$$v_{det}(t) = \eta P_a + \eta P_a s(t) \otimes R(v_c t/2) = v_0 + v_{det}'(t), \quad (1)$$

where η is the conversion efficiency of the detector, $v_0 \cong \eta P_a$ and $v_{det}' = \eta P_a s(t) \otimes R(v_c t/2)$ are the dc- and ac-components of $v_{det}(t)$, respectively. Hereafter, the prime (') is used to express the ac-component.

For the calculation of the cross-correlation, the transmitted data signal is used as a reference signal. The voltage of the data signal $v_{ref}(t)$ (i.e., reference signal) can be expressed by using s(t) as follows:

$$v_{ref}(t) = v_{ref0} + v_{ref0} s(t) = v_{ref0} + v_{ref}'(t), \quad (2)$$

where $v_{ref0}$ and $v_{ref}'(t)$ are the dc- and ac-components of $v_{ref}(t)$, respectively. The cross-correlation function $q(\tau)$ between $v_{det}'(t)$ and $v_{ref}'(t)$ is given by $$q(\tau) = \langle v_{det}'(t) \cdot v_{ref}'(t+\tau) \rangle = \eta P_a v_{ref0} \phi_s(\tau) \otimes R(v_c \tau/2), \quad (3)$$

where $\langle \rangle$ stands for ensemble average and $\phi_s(\tau)$ is the autocorrelation function of $s(t)$. ($\phi_s(\tau) = 1 - |\tau|/T$ for $|\tau| < T$ and $\phi_s(\tau) = 0$ for $|\tau| \geq T$). Since T is sufficiently short, $\phi_s(\tau)$ can be well approximated by using a delta function as $T\delta(\tau)$. Then, Eq. (3) becomes $q(\tau) = \eta P_a v_{ref0} TR(v_c \tau/2)$. Thus, the reflectivity distribution can be derived by using the cross-correlation function $q(\tau)$ as $R(z) \propto q(2z/v_c)$.

Figure 2A:
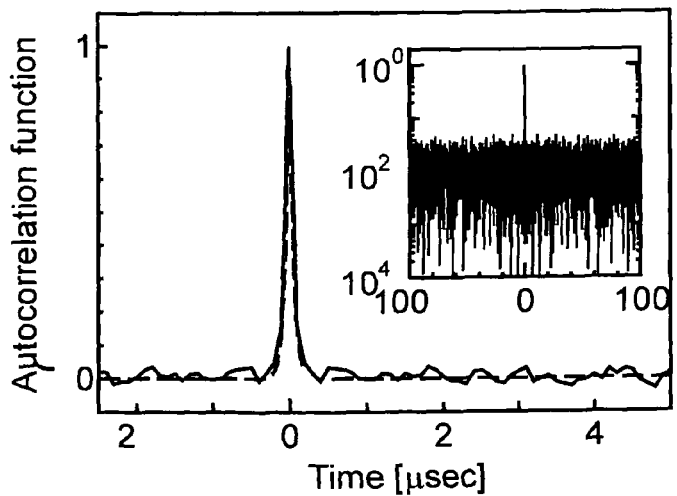
FIG. 2A shows the autocorrelation function of the reference signal.

As mentioned, since the transmission speed is extremely fast (>1 Gbit/s) in most optical networks, it would not be practical to implement the proposed technique described above due to the high sampling rate required for measuring $v_{det}'(t)$ and $v_{ref}'(t)$. In order to cope with this difficulty in this invention, the low-frequency components of $v_{ref}'(t)$ and $v_{det}'(t)$ are filtered out by using a first-order low-pass filter with a cut-off frequency of $f_c$ (<<B). Here, let $v_{ref,f}'(t)$ and $v_{det,f}'(t)$ denote the ac-components of the reference and returned signals after filtering, respectively. Then, the cross-correlation function between $v_{ref,f}'(t)$ and $v_{det,f}'(t)$ is given by $$q(\tau) = \langle v_{det,f}'(t) \cdot v_{ref,f}'(t+\tau) \rangle = \eta P_a v_{ref0} \phi_{s,f}(\tau) \otimes R(v_c \tau/2) \quad (4)$$

where $\phi_{s,f}(\tau)$ is the autocorrelation function of $s_f(t)$, which is the signal derived by low-pass filtering of $s(t)$. Since $f_c << B$, $\phi_{s,f}(\tau)$ can be expressed by $\pi f_c T \exp(-2\pi f_c |\tau|)$. The dashed curve in FIG. 2(a) shows an example of $\phi_{s,f}(\tau)$ calculated for $f_c = 3$ MHz. It has a single peak with a finite time width and quickly converges to zero as $|\tau|$ increases. Since the cross-correlation obtained in Eq. (4) represents the convolution of this broadened autocorrelation function $\phi_{s,f}(\tau)$ and the distribution of the reflectivity, the spatial resolution is determined by the time width of $\phi_{s,f}(\tau)$. The spatial resolution is given as $0.22\, v_c/f_c$ when the spatial resolution is defined by using the full-width at half maximum (FWHM) of $\phi_{s,f}(\tau)$. For example, when $f_c = 3$ MHz, the spatial resolution becomes 15.0 m.

[Proposal of the Algorithm to Improve the Sn Ratio: Discrete Component Elimination Algorithm]

Next, the limitation on the dynamic range and its improvement are described as follows. For the practical purpose, $v_{ref,f}'(t)$ and $v_{det,f}'(t)$ are digitally processed after sampling and the data length is finite. Therefore, the ensemble average in Eq. (4) can be replaced with the average by using the sampled data with a finite sample length. In order to take this into account, the sampling interval and the total number of sampling points are denoted by $\Delta t$ and N, respectively. Thus, Eq. (4) can be rewritten as follows, $$q(k\Delta t) = \frac{1}{N} \sum_i^N v_{def,f}'(i\Delta t) \cdot v_{ref,f}'((i+k)\Delta t) = \quad (5)$$

$$\eta P_a v_{ref0} \phi_{s,f}(k\Delta t) \otimes R(v_c k\Delta t/2),$$

where k is an integer, and the convolution is carried out in the discrete time domain. In Eq. (5), $\phi_{s,f}(k\Delta t)$ is the autocorrelation function of $s_f(i\Delta t)$ given by $$\phi_{s,f}(k\Delta t) = \frac{1}{N} \sum_i^N s_f(i\Delta t) s_f((i+k)\Delta t). \quad (6)$$

The autocorrelation function $\phi_{s,f}(k\Delta t)$ has a sharp peak at $k\Delta t = 0$, but it accompanies with the noise background due to the finite sampling length. As an example, FIG. 2A shows the autocorrelation function of the reference signal. The dashed curve shows the autocorrelation function calculated by using the ensemble average with infinite averaging time. The solid curve shows the autocorrelation function with a finite length of the sampled data. The inset shows the same trace plotted in log scale. The solid curve in FIG. 2A shows $\phi_{s,f}(k\Delta t)$ simulated for N=4096, $\Delta t = 100$ nsec (sampling rate $f_s = 10$ MHz), and $f_c = 3$ MHz. In order to evaluate this background noise, the background noise suppression ratio (BNSR) is defined by the ratio of the peak amplitude to the standard deviation (i.e., root-mean square) of the background noise of $\phi_{s,f}$. By assuming that $s(t)$ is a stationary random variable, the BNSR analytically can be derived after some algebraic calculations as follows:

$$(BNSR) = N^{1/2} \left( \frac{1 - \exp(-4\pi f_c/f_s)}{1 + \exp(-4\pi f_c/f_s)} \right)^{1/2}. \quad (7)$$

Figure 2B:
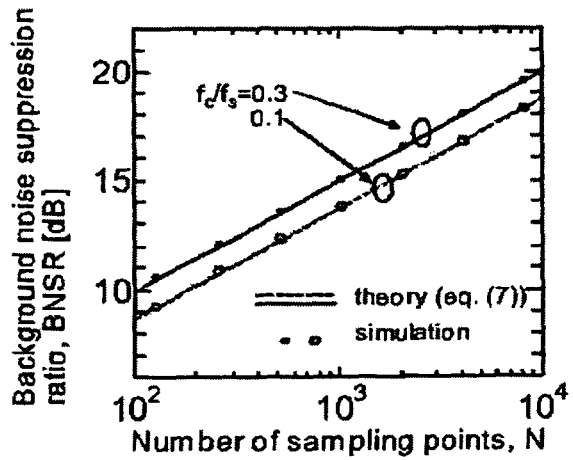
FIG. 2B shows the BNSR calculated as a function of the number of sampling points.

FIG. 2B shows the BNSR calculated as a function of the number of sampling points. The dotted and solid lines in FIG. 2B show the BNSR as a function of N for $f_c/f_s = 0.1$ and 0.3, respectively. For example, when N=4096, the BNSR becomes 18 dB.

Figure 3:
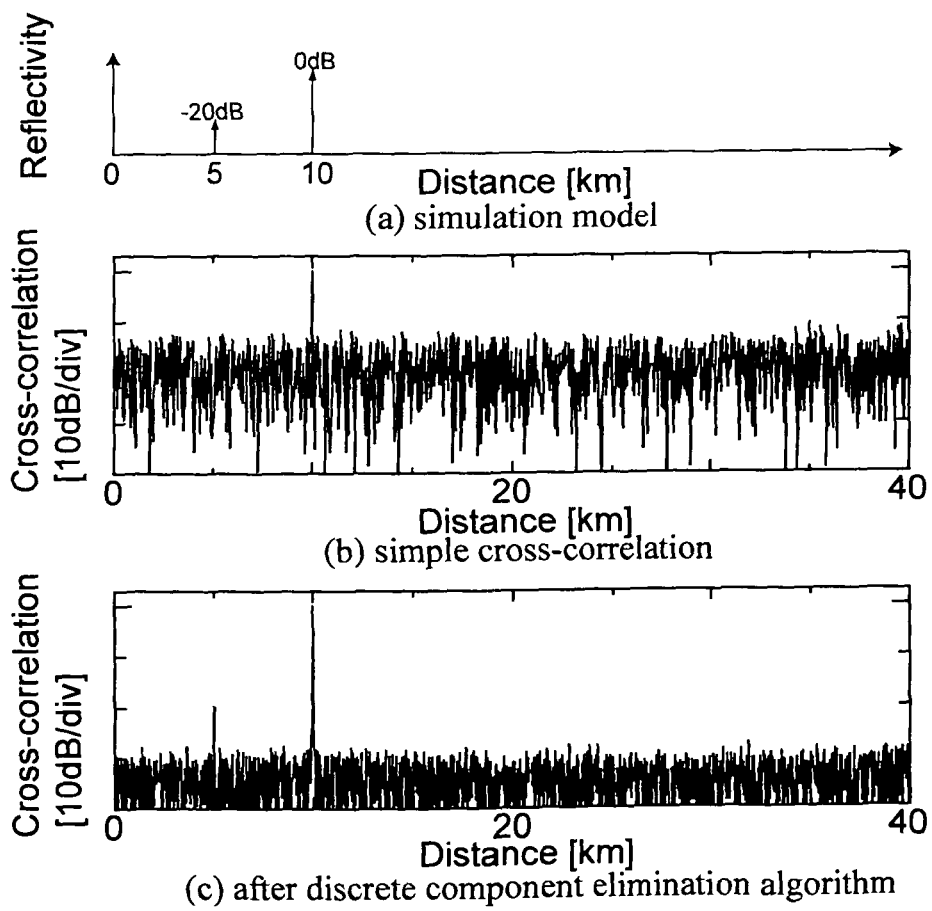
FIG. 3 shows the limitation on the dynamic range due to the signal-to-noise ratio and its improvement by the discrete component elimination algorithm.

Due to this background noise, the dynamic range can be severely deteriorated. FIG. 3 shows the limitation on the dynamic range due to the signal-to-noise ratio and its improvement by the discrete component elimination algorithm, which will be described in the next paragraph. In order to estimate the influence of the background noise, the proposed technique is implemented in the computer simulator by using the model shown in (a) of FIG. 3, in which two discrete reflection points are assumed at z=5 and 10 km with reflectivities of −20 dB and 0 dB, respectively. (b) of FIG. 3 shows the result obtained by simply calculating the cross-correlation function using Eq. (5). This figure shows that the low reflection point at 5 km is hidden by the noise background caused by the higher reflection point hides. As a result, the dynamic range is severely limited.

To improve the signal-to-noise ratio, that is, the BNSR, a new method is proposed, which is called the discrete component elimination algorithm. Since the reference signal $v_{det,f}'(t)$ is known, $\phi_{s,f}$ can be easily calculated. That is, it is possible to calculate the background noises generated from the discrete reflection points precisely. Thus, the background noise can be suppressed by the following steps of:

(a) calculating the cross-correlation using Eq. (5) directly;
 (b) finding the highest discrete reflection point in the cross-correlation trace;
 (c) calculating $\phi_{s,f}$ from the measured reference signal $v_{ref,f}'(t)$ and estimating the background noise components; and
 (d) subtracting it from the original cross-correlation function.

As an example, we applied this discrete component elimination algorithm to the cross-correlation trace shown in (b) of FIG. 3. The solid curve in (c) of FIG. 3 shows the result when the background noise generated by the peak at 10 km is subtracted by the proposed algorithm. The results show that the background noise level is drastically reduced and the small peak component located at 5 km can be clearly observed. The recursive use of this algorithm can substantially improve the BNSR even when there are many reflection points in the transmission line.

[Proposal of the Use of Averaging]

To improve the BNSR, the averaging of the many measurement results is also effective. In this case, the BNSR is improved by a factor of the square-root of the number of averaging. The averaging is also effective after the application of the discrete component elimination algorithm.

First Example

Figure 4:
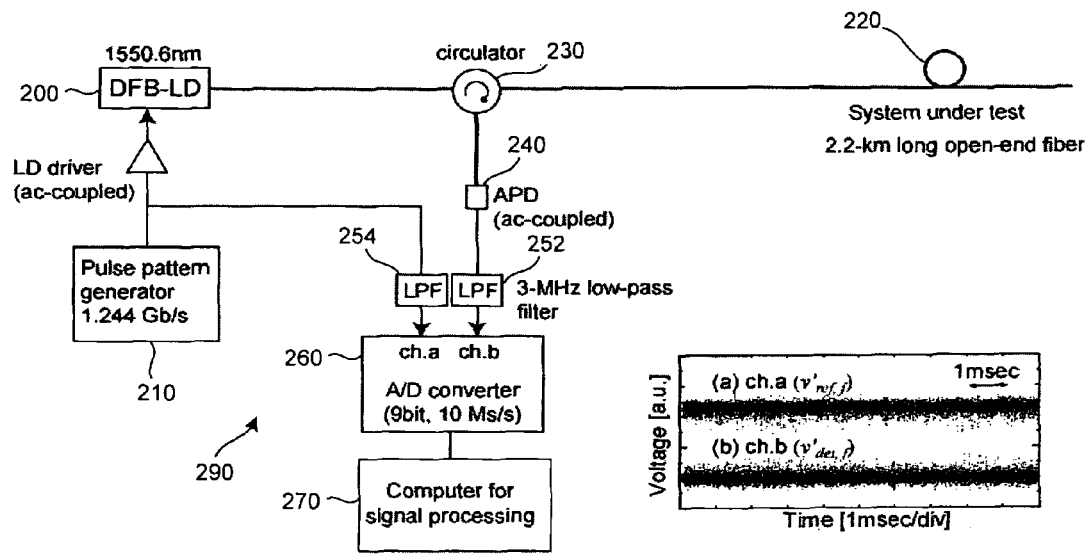
FIG. 4 shows the experimental setup, in which the present invention is applied to fiber-optic transmission links in service.

FIG. 4 shows the experimental setup 290, in which the present invention is applied to fiber-optic transmission links in service. A distributed-feedback (DFB) laser diode 200 operating at 1550.6 nm was used as an optical transmitter and is directly modulated with 1.25-Gb/s non-return-to-zero (NRZ) data using a pulse pattern generator 210 in order to demonstrate the system in service. The signal light was launched into a fiber 220 through an optical circulator 230. The average input power launched into the fiber was 0.8 dBm. To detect the back-reflected light, a conventional avalanche photo diode (APD) 240 was used, which was designed for a 155 Mb/s synchronous digital hierarchy (SDH) receiver. The data and the detected electric signals were respectively filtered out by 3-MHz LPFs 254 and 252, and digitized by a 9-bit A/D converter 260 at a sampling rate of 10 Msamples/s. Then, their cross-correlation was calculated by using a personal computer 270. In this experiment, the spatial resolution was determined by the bandwidth of the LPF 254 or 252 to be 15 m. The maximum number of sampling points of the A/D converter 260 was 4096, and the measurement range was 40.9 km. The inset in FIG. 4 shows an example of the sampled waveform of the reference and the detected back-reflected signals. Since the cut-off frequency of the LPF 254 or 252 was much lower than the bit-rate, the waveforms of the reference and detected back-reflected signals looked like noises. However, these signals have information enough to realize the reflectometry.

Figure 5:
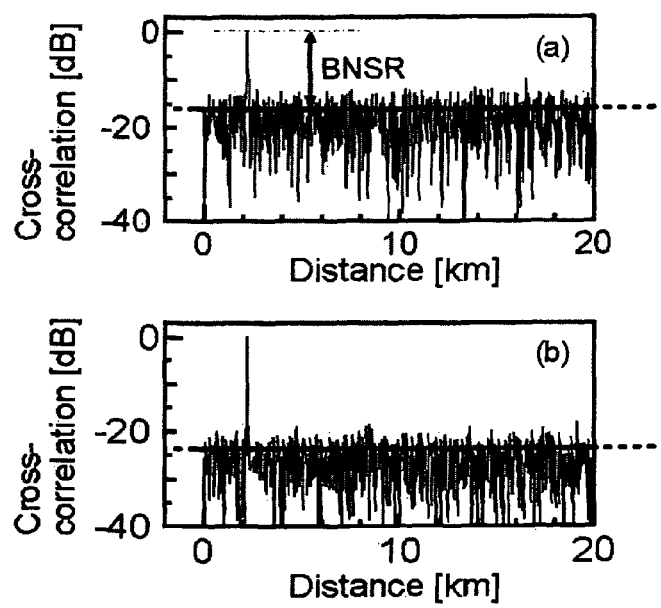
FIG. 5 shows the results of the measurement obtained in the first example.

First, the influence of the background noise originating from the background of the autocorrelation of the reference signal is investigated. In order to neglect the influence of the other impairment factors such as the quantization noise and the receiver noise, a relatively short length fiber of 2.2 km with an open end as a system under test. (a) of FIG. 5 shows the cross-correlation trace measured when N=4096. The reflection at the fiber end was clearly observed even without averaging, in spite of the background noise.

Then, the discrete component elimination algorithm is applied to evaluate the effectiveness in the improvement of the background noise. FIG. 5 shows the results of the measurement obtained in the first example, more particularly, (a) of FIG. 5 is cross-correlation trace and (b) of FIG. 5 is cross-correlation trace when the discrete component elimination algorithm was applied to (a) of FIG. 5. The dotted lines show the root-mean-square of the background noise, and the BNSR was defined by the ratio of the peak to this background noise level. This figure shows that the proposed algorithm could reduce the background noise level substantially.

Second Example

Figure 6:
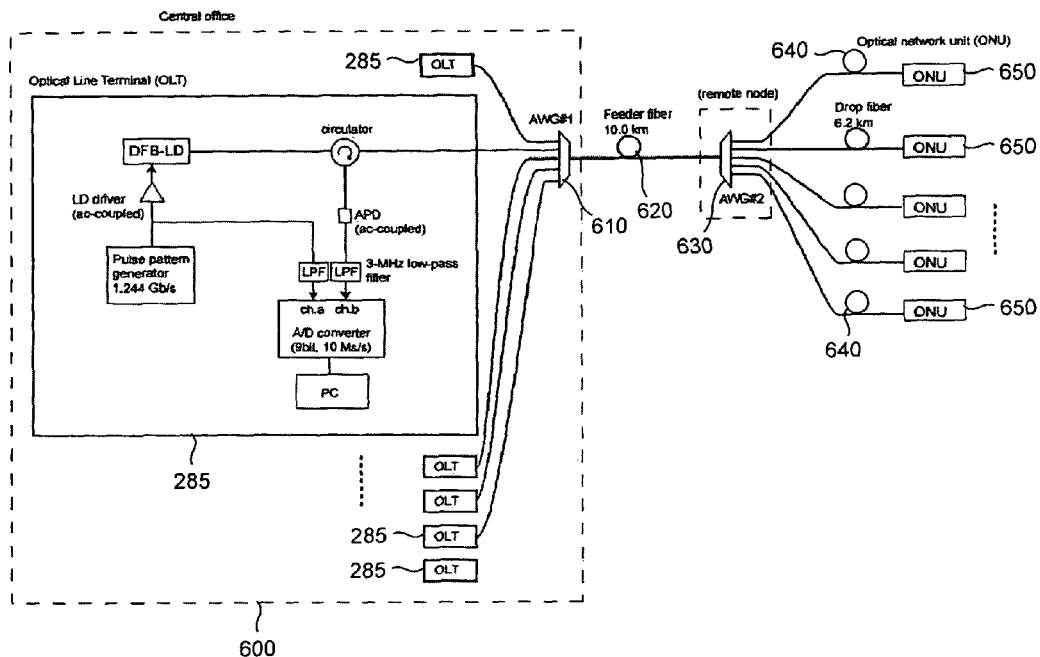
FIG. 6 shows the experimental setup used to demonstrate the in-service monitoring of the present invention in a WDM PON system.

FIG. 6 shows the experimental setup used to demonstrate the in-service monitoring of the present invention in a WDM PON system. The system under test consisted of the central office 600 which includes Optical Line Terminals (OLTs) 285 and an AWG#1 610, 10.0-km long feeder fiber 620, the remote node that consists of an AWG#2 630, and drop fibers 640. Optical network unit (ONU) 650 was attached to the end of each drop fiber 640. The insertion loss of each AWG was about 4.1 dB and the fibers had a propagation loss of 0.21 dB/km. The AWGs were 8-ch 200-GHz spacing arrayed-waveguide gratings. Each OLT 285 used in this example was the same as the experimental setup of the first example except for the fiber 220.

Figure 7:
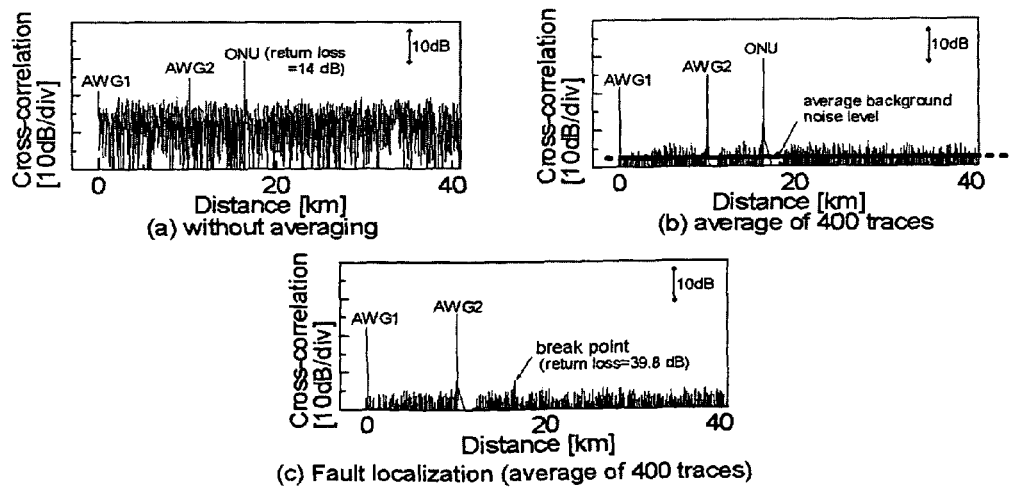
FIG. 7 shows the results of the measurement obtained in the second example.

FIG. 7 shows the results of the measurement obtained in the second example, more particularly, (a) of FIG. 7 shows the cross-correlation trace measured without averaging. The discrete reflections at the central office 600 (especially at AWG#1 610), the remote node (AWG#2 630), and the ONU 650 could be observed clearly even without averaging. In order to improve the signal-to-noise ratio further, the cross-correlation trace was measured by 400 times and averaged. (b) of FIG. 7 shows the result. The root mean square of the background noise level (shown in (b) of FIG. 7 by the dashed line) was below the Fresnel reflection at the ONU end by 27 dB, which corresponded to the return loss of 41 dB (64.8 dB including the round-trip loss). In the current standards on PON, the tolerable reflectivity (or optical return loss) is defined to be around −32~−26 dB. These values are much higher than the measurement limit of this setup. Thus, the present invention can be used for the detection of the abnormal reflections (i.e., caused by irregular connections or fiber breaks) along the transmission line. To demonstrate the possibility of using the present invention for localizing the fiber failure, a break point having a reflectivity of −39.8 dB was intentionally made just before the ONU, and measured the cross-correlation. The result is shown in (c) of FIG. 7 and it is confirmed that the present invention could indeed localize this break point. In this way, the present invention could be used for the in-service monitoring of WDM PON.

Third Example

Figure 8:
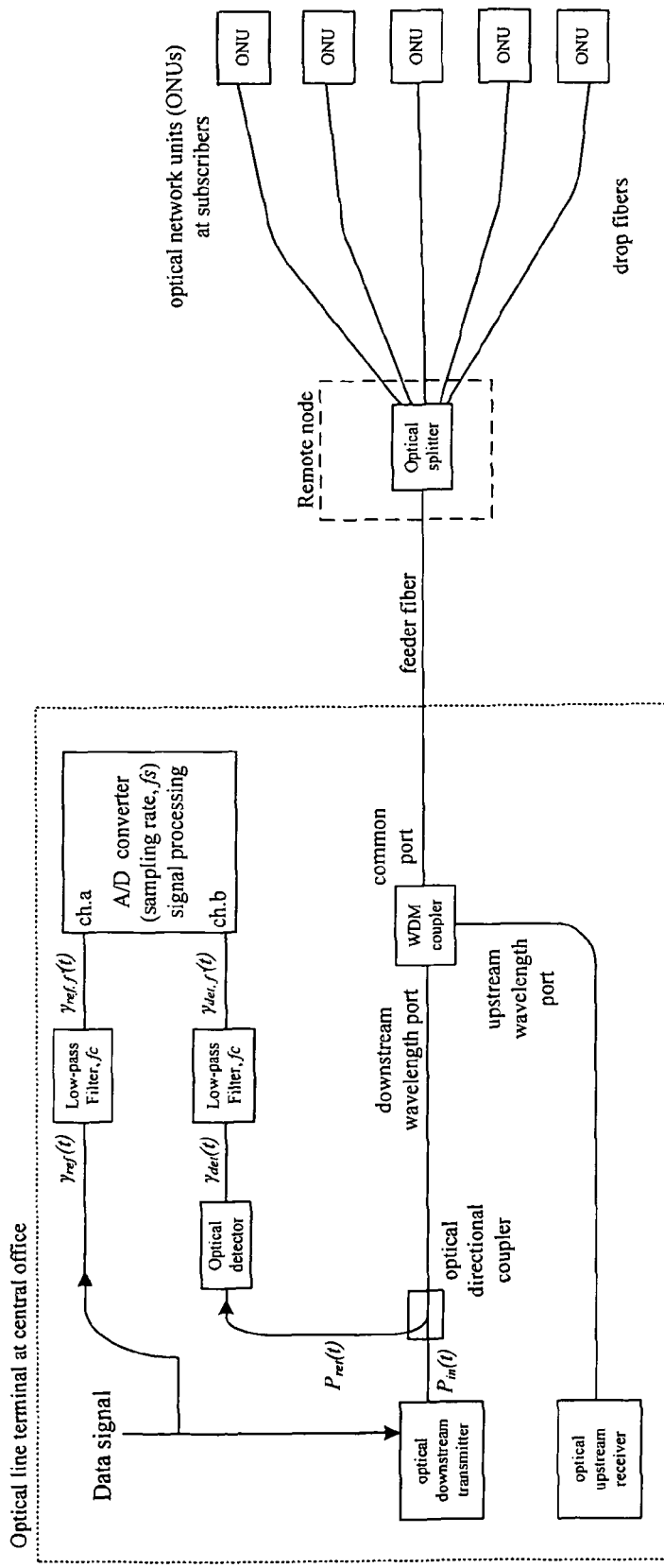
FIG. 8 shows the implementation of the present invention to a PON system.

FIG. 8 shows the implementation of the present invention to a PON system. The downstream signal from the optical line terminal (OLT) is distributed to the subscribers through the optical splitter at the remote node. Therefore, by applying the present invention to the PON system, the simultaneous monitoring of drop fiber cables is possible.

Fourth Example

Figure 9:
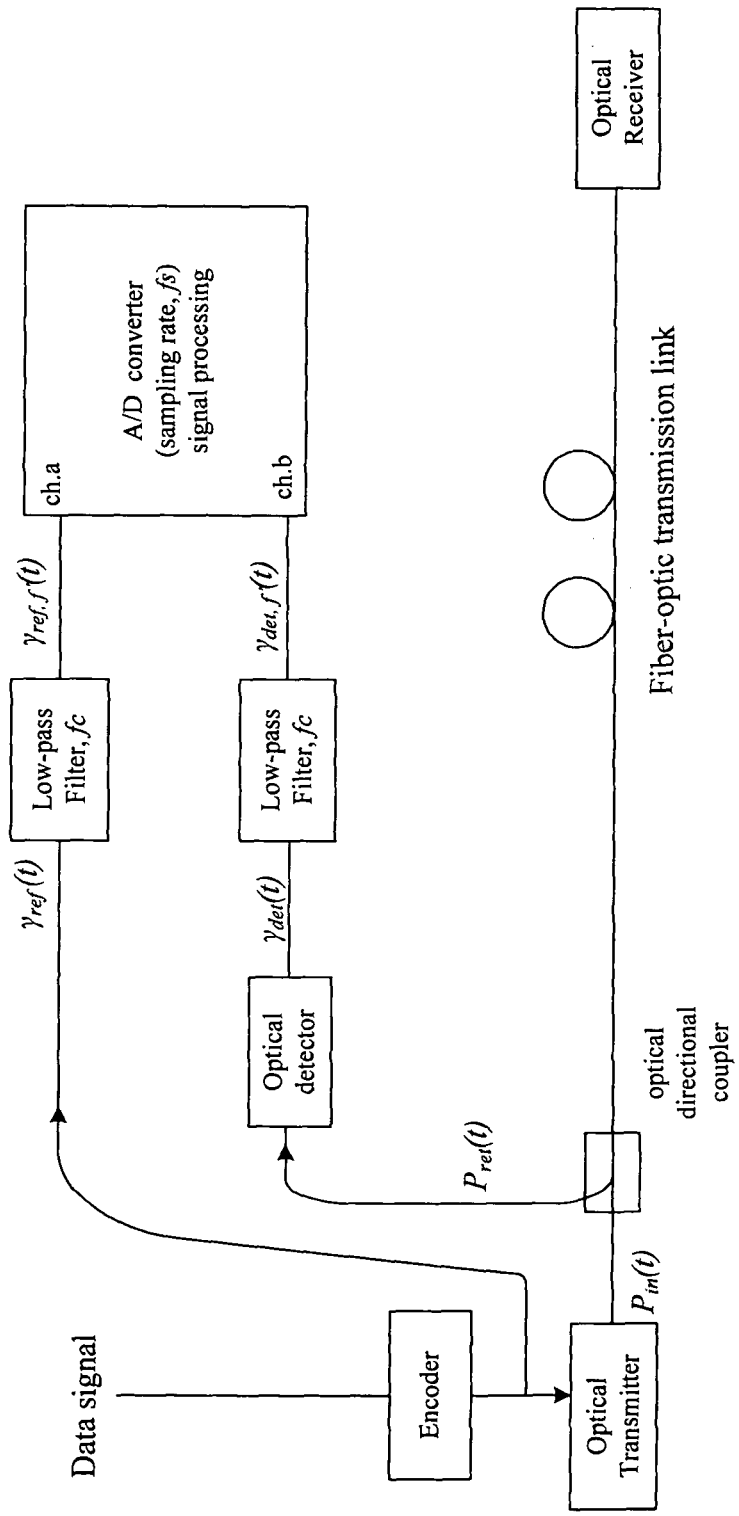
FIG. 9 is a schematic diagram for explaining the fourth example, in which the optical transmitter is modulated with a signal after encoding the data signal.

In some of advanced optical transmitters, the data signal is modulated after encoding. This encoding includes the consecutive-zero suppression like 8B-10B coding and 64B-66B coding as used in Ethernet, the scrambling with the pseudo-random bit sequence, and the error correction code. In such a case, the reference signal can be obtained after the encoding as shown in FIG. 9. FIG. 9 is a schematic diagram for explaining the fourth example, in which the optical transmitter is modulated with a signal after encoding the data signal.

Fifth Example

The present invention can also be applied to the analog fiber-optic link, in which the optical transmitter is modulated with an analog signal such as the video signal.

By using the signal light itself as a probe light, the in-service monitoring of the fiber fault is possible. In addition, since the present invention does not require the modification of the optical transmitter, it can be applied to any existing optical transmitter.

By limiting the bandwidth of the signals for the calculation of the cross-correlation, the requirements for the A/D converters, the memories and the signal processor for the calculation are greatly relaxed. For example, when the system length is 40 km and the data rate is 1.25 Gbit/s, the prior art in U.S. Pat. No. 4,911,515 requires the data length of 500,000 samples and the sampling rate higher than 1.25 Gsamples/s. On the other hand, the present invention requires only the data length of several thousands of samples and the sampling rate is at most 10 Msamples/s. In addition, these are independent of the data rate. Therefore, the present invention is very effective particularly in high speed systems.

The measurement of the distribution of the reflectivity of a fiber-optic transmission link can be made by calculating the cross-correlation function between the low-pass-filtered data signal and the back-reflected signal. Owing to this signal processing based on the cross correlation function, the delay line, which is required in U.S. Pat. No. 4,911,515, can be eliminated in the present invention. Consequently, the operation becomes very simple.

Although the dynamic range of the reflectivity is limited due to the imperfect correlation characteristics of the finite-length signals, it can be compensated by using the discrete component elimination algorithm. In the computer simulation, it was shown that the dynamic range is improved by more than 20 dB.

Also, the dynamic range can be further improved by averaging the measured cross-correlation functions. In the experiment, more than 13-dB improvement was achieved by 400-time averaging.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for measuring a distribution of reflectivity along a fiber-optic transmission link connected to an optical transmitter, the method comprising the steps of:
    (a-1) filtering a data signal transmitted by the optical transmitter by using a low-pass filter;
    (a-2) detecting a back-reflected optical signal that returns to the optical transmitter and converting it to an electrical signal;
    (a-3) filtering the detected back-reflected optical signal by using a low-pass filter;
    (a-4) calculating a cross-correlation function, $q(\tau)$, between the filtered data signal and the filtered back-reflected optical signal, wherein $\tau$ is time and the cross-correlation function $q(\tau)$ is obtained by ensemble average of the filtered data signal and the filtered back-reflected optical signal; and
    (a-5) converting time axis of the calculated cross-correlation function $q(\tau)$ from time $\tau$ to distance z from the optical transmitter and obtaining the distribution of the reflectivity as $R(z)=k \cdot q(2z/v_c)$, wherein $v_c$ is the group velocity of light in the fiber and the coefficient k is obtained based on an average input power to the fiber-optic transmission link and a conversion efficiency of an optical detection means.

2. The method according to claim 1, wherein the low-pass filtering in the (a-1) and (a-3) steps is performed with a cut-off frequency lower than the bandwidth of the data signal.

3. The method according to claim 1, in order to improve a signal-to-noise ratio of the cross-correlation function obtained by the (a-4) step of claim 1, the method further comprising the steps of:
    (b-1) finding a highest discrete reflection point in the cross-correlation function;
    (b-2) calculating an autocorrelation function of the filtered data signal;
    (b-3) estimating a background noise component from the reflectivity of the discrete reflection point found in the (b-1) step and the autocorrelation function obtained in the (b-2) step;
    (b-4) subtracting the estimated background noise from the cross-correlation function; and
    (b-5) applying the steps from (b-1) to (b-4) recursively.

4. The method according to claim 3, wherein the steps from (b-1) to (b-5) are performed in signal processing means.

5. The method according to claim 1, further comprising a step of averaging the cross-correlation function obtained in the (a-4) step to improve a signal-to-noise ratio of the distribution of the reflectivity.

6. The method according to claim 5, wherein the averaging step is performed in signal processing means.

7. The method according to claim 1, further comprising a step of averaging the distribution of the reflectivity obtained in the (a-5) step to improve the signal-to-noise ratio of the measured reflectivity.

8. The method according to claim 7, wherein the averaging step is performed in signal processing means.

9. An apparatus for monitoring a fault in a fiber-optic transmission link connected to an optical transmitter which is modulated with a data signal by measuring a distribution of reflectivity along the link, the apparatus comprising:
    optical directional coupling means for taking out a back-reflected signal returned from the fiber-optic transmission link to the optical transmitter, located between the optical transmitter and the fiber-optic transmission link;
    optical detection means for detecting the back-reflected signal as an electronic signal;
    a first low pass filter for extracting a low frequency component of the back-reflected signal with a cut-off frequency lower than the data signal;
    a second low pass filter for extracting the low frequency component of the data signal with a cut-off frequency lower than the data signal;
    data acquisition means for converting the filtered back-reflected signal and the filtered data signal; and
    signal processing means for calculating a cross-correlation function, $q(\tau)$, between the filtered data signal and the filtered back-reflected signal, wherein $\tau$ is time and the cross-correlation function $q(\tau)$ is obtained by ensemble average of the filtered data signal and the filtered back-reflected signal, and converting time axis of the calculated cross-correlation function $q(\tau)$ from the time $\tau$ to distance z from the optical transmitter and obtaining the distribution of the reflectivity as $R(z)=k \cdot q(2z/v_c)$, wherein $v_c$ is the group velocity of light in the fiber and the coefficient k is obtained based on an average input power to the fiber-optic transmission link and a conversion efficiency of the optical detection means.

10. The apparatus according to claim 9, wherein the optical directional coupling means is an optical isolator.

11. The apparatus according to claim 9, wherein the optical directional coupling means is an optical coupler.

12. The apparatus according to claim 9, wherein the fiber-optic transmission link includes an optical network.

13. The apparatus according to claim 9, wherein the fiber-optic transmission link includes a passive optical network comprising a drop fiber cable, a remote node, and feeder fiber cables connected to subscribers.

* * * * *